United States Patent [19]

Ornberg et al.

[11] Patent Number: 4,848,518
[45] Date of Patent: Jul. 18, 1989

[54] METHOD AND APPARATUS FOR PREVENTING FLUID LEAKAGE FROM A GEAR CASE

[75] Inventors: John H. Ornberg, Westerly; Glenn A. Guaraldi, WoodRiver Junction, both of R.I.

[73] Assignee: AM International, Inc., Chicago, Ill.

[21] Appl. No.: 196,982

[22] Filed: May 20, 1988

[51] Int. Cl.$^4$ .................... F01M 9/10; F01M 13/02
[52] U.S. Cl. .................................. 184/6.12; 74/467
[58] Field of Search ............... 184/6.12, 6.23, 6, 13.1, 184/109; 74/467

[56] References Cited

U.S. PATENT DOCUMENTS 4,046,222 9/1977 Shrivaner et al. ............... 184/6.12
4,263,981 4/1981 Weiss et al. ........................ 181/252
4,632,650 12/1986 Frieden et al. ..................... 418/206

Primary Examiner—Carlton R. Croyle
Assistant Examiner—Robert N. Blackmon
Attorney, Agent, or Firm—Tarolli, Sundheim & Covell

[57] ABSTRACT

A method and apparatus is disclosed for preventing leakage of a fluid such as a lubricant from a gear case. In this method and apparatus, the ambient pressure inside the gear case is maintained slightly lower than the air pressure outside the gear case. By maintaining this pressure differential, air flows from outside the gear case into the gear case through any openings from which lubricant would otherwise leak. Leakage of the lubricant through such openings in the gear case is thereby prevented.

9 Claims, 2 Drawing Sheets

METHOD AND APPARATUS FOR PREVENTING FLUID LEAKAGE FROM A GEAR CASE

TECHNICAL FIELD

The present invention relates to an apparatus and method for preventing leakage of lubricant from a gear case. In particular, the present invention relates to an apparatus and method for preventing leakage of lubricant from a gear case of a printing press.

BACKGROUND ART

A printing press typically has printing cylinders which are driven by intermeshing gears. The gears are located in a gear case which encloses the gears. The gears are lubricated by a suitable lubricating fluid such as oil. The oil is pumped from a reservoir at the bottom of the gear case to the top of the gear case. The oil is then splattered onto the gears to lubricate the gears.

The gear case includes a main housing portion and an access cover. A sealing material such as a gasket is disposed between the main housing portion and the access cover to provide fluid sealing engagement. The access cover is routinely removed to provide accessibility to parts within the gear case so that maintenance or repair can be performed. The access cover is replaced after service is completed.

The fluid sealing effectiveness of the gasket between the main housing portion and the access cover may be lessened each time the access cover is removed and replaced. If the fluid sealing effectiveness of the gasket is lessened, then oil leaks may develop between the main housing portion and the access cover resulting in oil loss from the gear case. If oil leaks from the gear case, an undesirable puddle of oil forms outside of the gear case. Also, from time to time, new oil must be added to replace the oil which leaked from the gear case. It is desirable to prevent such oil leaks from the gear case.

SUMMARY OF THE INVENTION

The present invention is directed to a method and apparatus for preventing leakage of lubricant from a gear case. In the method and apparatus, the ambient pressure inside the gear case is maintained slightly lower than the air pressure outside the gear case. Thus, air flows into the gear case through any openings from which oil would otherwise leak. This prevents oil leakage through such openings.

In a preferred embodiment of the present invention, the apparatus includes a gear case having a main housing portion and at least one access cover. The apparatus further includes an oil pump for pumping oil from a reservoir at the bottom of the gear case to the top of the gear case. The apparatus further includes a filtered air inlet assembly connected to the upper portion of the gear case. The air inlet assembly includes a valve regulator and a manual control for controlling the valve regulator. The amount of air flow from outside the gear case to inside the gear case can be varied by controlling the valve regulator.

The apparatus further includes an air outlet assembly connected to the upper portion of the gear case above the lubricant reservoir and below the air inlet assembly. The air outlet assembly includes a vacuum pump and an air channel connected between the gear case and the vacuum pump. The vacuum pump, when actuated, pumps air from inside the gear case to outside the gear case and thus lowers the pressure in the gear case below the ambient pressure outside the gear case.

During normal operation, the vacuum pump is actuated and the oil pump is turned on. Oil is pumped from the bottom of the gear case to the top of the gear case. The oil is then splattered onto the gears to provide lubrication. As the oil splatters the gears, an oil mist may form. The vacuum pump is actuated, and the air and the oil mist are pumped from inside the gear case to outside the gear case. The valve regulator allows outside air to flow into the gear case and is adjusted so that the pressure inside the gear case is maintained slightly lower than the air pressure outside the gear case. If a small seam or opening appears in the gear case, such as between the main housing portion and the access cover of the gear case, air is continuously drawn through the small seam or opening from outside the gear case to inside the gear case. Oil leakage through the small seam or opening is prevented by the flow of air into the gear case through the small seam or opening.

BRIEF DESCRIPTION OF THE DRAWINGS

The foregoing and other features and advantages of the present invention will become apparent to one skilled in the art to which the present invention relates from reading the following description of a preferred embodiment in conjunction with the accompanying drawings, wherein.

DESCRIPTION OF A PREFERRED EMBODIMENT OF THE INVENTION

Figure 1:
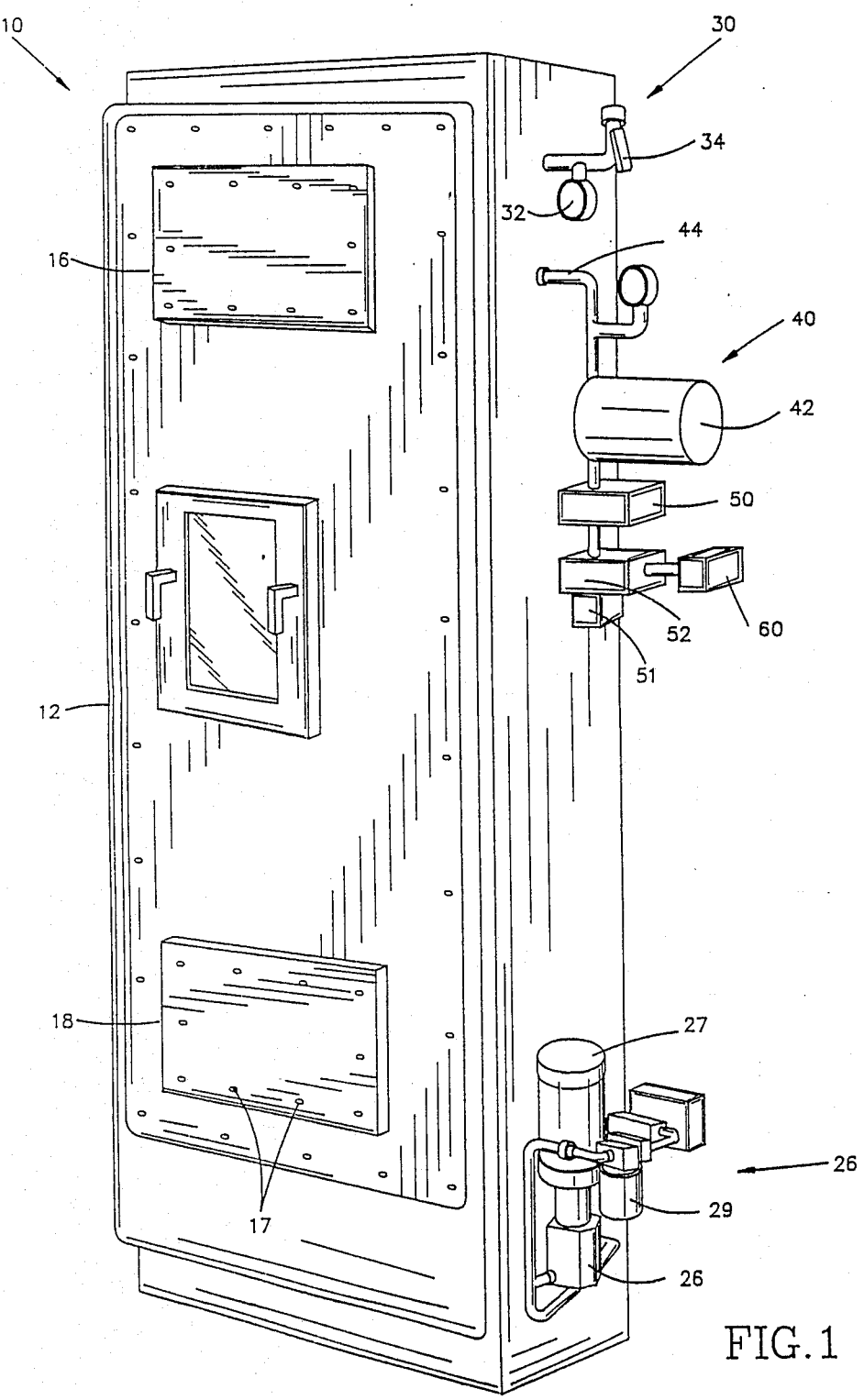
FIG. 1 is a perspective view illustrating a gear case constructed in accordance with the present invention.
Figure 2:
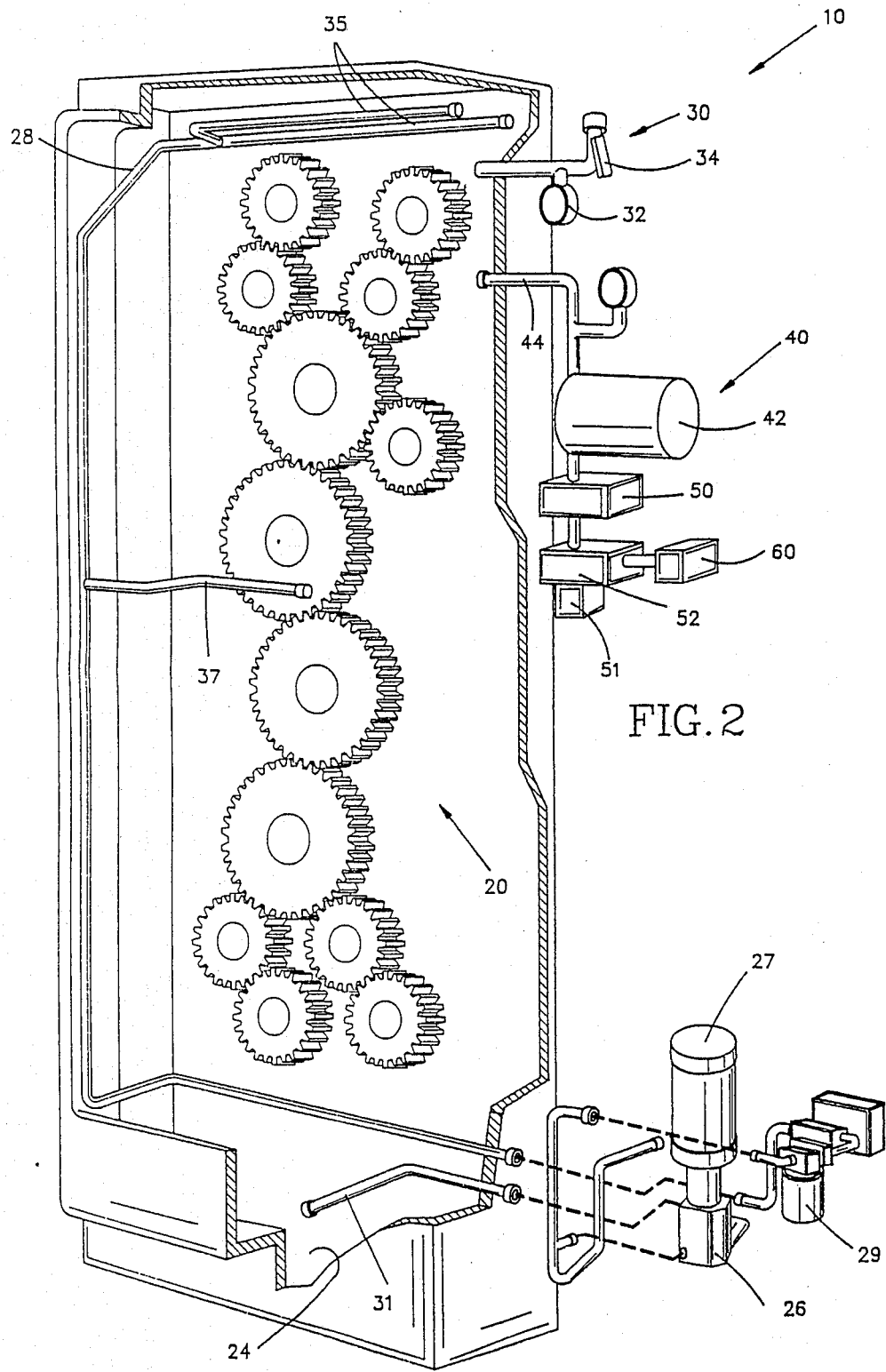
FIG. 2 is a schematic view of FIG. 1 illustrating the gear case with cover removed.

The present invention relates to an apparatus and method for preventing leakage of lubricant from a gear case. The construction of the gear case may vary. As representative of the present invention, FIGS. 1 and 2 illustrate a gear case 10 of a printing press.

The gear case 10 includes a main housing portion 12. The gear case 10 further includes two access covers 16, 18 connected to the main housing portion 12 with suitable fasteners 17. Each of the access covers 16, 18 is removable from the front of the main housing portion 12 to provide accessibility to parts within the gear case 10 so that maintenance or repair can be performed. A plurality of meshing gears 20 within the gear case 10 is drivingly connected to a plurality of cylinders of the printing press (not shown). Each cylinder of the plurality of cylinders is operatively connected to an associated roller (not shown) of the printing press.

An oil reservoir 24 located at the bottom of the gear case 10 is filled with a lubricating fluid, such as oil. One end of a sump line 31 is immersed in the oil contained in the oil reservoir 24. The other end of the sump line 31 is connected to the inlet port of an oil pump 26. The oil pump 26 is of any conventional design and manufacture. The oil pump 26 has an input port and an output port. A motor 27 drives the oil pump 26 to pump lubricant from the input port of the oil pump 26 to the output port of the oil pump 26. The output port of the oil pump 26 is connected to the input port of an oil filter 29. The output port of the oil filter 29 is connected to an oil distribution network 28.

When the motor 27 is actuated, the oil pump 26 pumps oil from the oil reservoir 24 into the oil distribution network 28. After the oil is pumped into the oil distribution network 28, the oil is channeled into a spray manifold 35 located near the top of the gear case 10 and into a spray manifold 37 located in the central portion of the gear case 10. As the oil is channeled into each of the spray manifolds 35, 37, the oil is sprayed and splattered onto the plurality of meshing gears 20 in the gear case 10, thereby lubricating the gears 20.

The gear case 10 further includes a filtered air inlet assembly 30 connected to the upper portion of the gear case 10. The air inlet assembly 30 has a valve regulator 32 for regulating the amount of air flow from the outside of the gear case 10 to the inside of the gear case 10. The valve regulator 32 has a handle 34 which is manually movable between two end positions. When the handle 34 is at one end position, the restriction of air flow through the air inlet assembly 30 is at a maximum. As the handle 34 is moved towards the other end position, the restriction of air flow through the air inlet assembly 30 decreases. When the handle 34 is at the other end position, the restriction of air flow through the air inlet assembly 30 is at a minimum. Thus, the amount of air flow from outside of the gear case 10 to the inside of the gear case 10 through the air inlet assembly 30 can be controlled by moving the handle 34 between the two end positions.

The gear case 10 further includes a motor-driven, vacuum pump assembly 40. The vacuum pump assembly 40 is of a conventional design and manufacture. The vacuum pump assembly 40 is connected to the upper portion of the gear case 10 and is positioned below the air inlet assembly 30. The vacuum pump assembly 40 includes an actuatable vacuum pump 42 and an air channel 44 connected between the gear case 10 and the vacuum pump 42. When actuated, the vacuum pump 42 pumps the air from inside the gear case 10 through the air channel 44 to outside the gear case 10.

During normal operation, the vacuum pump 42 is actuated and the oil pump 26 is turned on. Oil is pumped from the oil reservoir 24 at the bottom of the gear case 10 to the top of the gear case 10 and to the central portion of the gear case 10. The oil is sprayed and splattered onto the plurality of gears 20. When the oil splatters onto the plurality of gears 20, an oil mist may form. The vacuum pump 42 pumps the air and the oil mist from inside the gear case 10 to outside the gear case 10. An air flow is established through the air inlet assembly 30. The air flows from outside the gear case 10 to inside the gear case 10. The valve regulator 32 is adjusted so that the pressure inside the gear case 10 is maintained slightly lower than the air pressure outside the gear case 10.

After the air and the oil mist are pumped from inside the gear case 10 to outside the gear case 10, a conventional oil separator 50 separates the air from the oil. The separated oil is collected in an oil accumulator 52 connected to the oil separator 50. The separated air is passed to a muffler 60 operatively connected to the vacuum pump assembly 40. The muffler 60 dampens noise generated by the vacuum pump assembly 40 as the vacuum pump 42 pumps air from inside the gear case 10 to outside the gear case 10.

The system includes an actuatable solenoid valve 51 which, when actuated, opens a fluid passage (not shown) in the oil accumulator 52 to drain the collected oil from the oil accumulator 52 into the gear case 10 and thus back to the oil reservoir 24 located at the bottom of the gear case 10. The solenoid valve 51 is closed during operation of the printing press. The solenoid valve 51 is opened automatically when the printing press is not in operation. Thus, the solenoid valve 51 is actuated to drain the oil collected in the oil accumulator 52 whenever operation of the printing press is stopped.

The access covers 16, 18 are routinely removed to provide accessibility to parts within the gear case 10 so that maintenance or repair can be performed. The access covers are replaced after service is completed. Each time an access cover is removed and replaced, the fluid sealing engagement between the main housing portion 12 and the access cover may be lessened. If the fluid sealing effectiveness between the main housing portion 12 and an access cover is lessened, small seams or openings may develop between the main housing portion 12 and the access cover.

The oil within the gear case 10 tends to leak through these small seams or openings because of the fluid characteristics of the oil. Since the pressure inside the gear case 10 is maintained slightly lower than the air pressure outside the gear case 10, air is continuously drawn through these small seams or openings from outside the gear case 10 to inside the gear case 10. This continuous drawing of air from outside the gear case 10 to inside the gear case 10 prevents oil leaks through the small seams or openings in the gear case 10.

This invention has been described above with reference to a preferred embodiment. Modifications and alterations may become apparent to one skilled in the art upon reading and understanding this specification. It is intended to include all such modifications and alterations within the scope of the appended claims.

Having described a specific preferred embodiment of the invention, the following is claimed:

1. An apparatus for preventing leakage of lubricating fluid from inside a gear case to outside the gear case through an opening in the gear case, said apparatus comprising:

means for reducing the pressure inside the gear case relative to the pressure outside the gear case;

conduit means spaced from said pressure reducing means to direct air from outside the gear case to inside the gear case; and means in said conduit means for adjustably regulating air flow through said conduit means from outside the gear case to inside the gear case;

said pressure reducing means cooperating with said means for adjustably regulating air flow to maintain the pressure inside the gear case at a predetermined level lower than the pressure outside the gear case, the pressure differential causing air to flow from outside the gear case to inside the gear case through the opening in the gear case thereby preventing leakage of lubricating fluid from inside the gear case to outside the gear case through the opening in the gear case.

2. The apparatus of claim 1 wherein said means for adjustably regulating air flow includes a filtered air inlet connected to the gear case for providing an air flow path from outside the gear case to inside the gear case, and a valve regulator connected to said filtered air inlet for regulating the amount of air flow from outside the gear case to inside the gear case.

3. The apparatus of claim 1 wherein said pressure reducing means includes an actuatable motor-driven vacuum pump connected to the gear case for pumping air from inside the gear case to outside the gear case.

4. The apparatus of claim 3 wherein said pressure reducing means further includes an oil separator connected to said vacuum pump for separating any lubricating fluid pumped from inside the gear case to outside the gear case by said vacuum pump, and an oil accumulator connected to said oil separator for collecting the separated oil from said separator.

5. The apparatus of claim 4 further including an actuatable solenoid valve for, when actuated, opening a fluid passage to drain the collected oil from said oil accumulator to inside the gear case.

6. The apparatus of claim 3 wherein said pressure reducing means further includes a muffler operatively connected to said vacuum pump to dampen noise generated by said vacuum pump pumping air from inside the gear case to outside the gear case.

7. The apparatus of claim 1 further comprising an oil separator connected to said vacuum pump for separating lubricating fluid pumped from inside the gear case to outside the gear case by said vacuum pump, an oil accumulator connected to said oil separator for collecting the separated oil from said separator, and an actuatable solenoid valve for, when actuated, opening a fluid passage to drain the collected oil from said oil accumulator to a reservoir.

8. The apparatus of claim 7 wherein said meshing gears comprises a plurality of vertically spaced gears for driving cylinders of a printing press and said apparatus further comprises an oil reservoir located at the bottom of said gear case, an oil distribution network for splattering oil onto said vertically spaced gears, and an oil pump for pumping oil from said reservoir into said oil distribution network, said solenoid valve being actuatable in response to shut-off of the printing press to open the fluid passage to drain the collected oil from said oil accumulator to said oil reservoir at the bottom of said gear case.

9. An apparatus comprising:
a gear case having an access opening therein;
meshing gears located in said gear case;
cover means covering said access opening and releasably attached to said gear case for removal of said cover means for servicing purposes; and
means for preventing leakage of lubricating fluid from inside said gear case to outside said gear case through an opening which may be formed between said cover means and said gear case, said preventing means comprising:
  a vacuum pump connected to said gear case for reducing the pressure inside said gear case below the pressure outside said gear case,
  conduit means spaced from said vacuum pump form directing air from outside said gear case to inside said gear case, and
  means in said conduit means for adjustably regulating air flow through said conduit means from outside said gear case to inside said gear case;
said regulating means cooperating with said vacuum pump to maintain the pressure inside the gear case at a predetermined level to establish a predetermined pressure differential between the pressure inside said gear case and the pressure outside said gear case, said pressure differential causing air to flow from outside said gear cause to inside said gear case through any opening between said cover means and said gear case whereby leakage of lubricating fluid from inside said gear case to outside said gear case through any opening betewen said cover means and said gear case is prevented.

* * * * *

UNITED STATES PATENT AND TRADEMARK OFFICE
CERTIFICATE OF CORRECTION

PATENT NO. : 4,848,518

DATED : July 18, 1989

INVENTOR(S) : John H. Ornberg and Glenn A. Guaraldi

It is certified that error appears in the above-identified patent and that said Letters Patent is hereby corrected as shown below:

Column 6, Line 18, change "form" to --for--.

Column 6, Line 29, change "cause" to --case--.

Signed and Sealed this

Seventeenth Day of April, 1990

Attest:

HARRY F. MANBECK, JR.

*Attesting Officer*　　　*Commissioner of Patents and Trademarks*